United States Patent
Capanna

[11] Patent Number: 5,881,438
[45] Date of Patent: Mar. 16, 1999

[54] EXTRUDABLE LOCKING CLAMP WITH RELEASE

[75] Inventor: Micael Capanna, Nipomo, Calif.

[73] Assignee: Centurion Safety Products, Inc., San Luis Obispo, Calif.

[21] Appl. No.: 64,294

[22] Filed: Apr. 22, 1998

Related U.S. Application Data

[60] Provisional application No. 60/045,378 May 1, 1997.

[51] Int. Cl.$^6$ .............................. A44B 21/00; F16B 2/00
[52] U.S. Cl. ................................. 24/545; 24/543; 24/557
[58] Field of Search ........................... 24/545, 543, 553, 24/557, 541, 516; 248/74.2

[56] References Cited

U.S. PATENT DOCUMENTS

| | | | |
|---|---|---|---|
| 4,386,752 | 6/1983 | Pavlak et al. | 24/543 |
| 4,591,119 | 5/1986 | Kraus | 248/74.2 |
| 5,027,538 | 7/1991 | Wilmes et al. | 24/545 |
| 5,535,970 | 7/1996 | Gobbi | 24/557 |
| 5,699,943 | 12/1997 | Schaefer et al. | 24/516 |
| 5,782,090 | 7/1998 | Locke | 248/74.2 |

*Primary Examiner*—Victor N. Sakran
*Attorney, Agent, or Firm*—Daniel C. McKown

[57] ABSTRACT

A one-piece article having a uniform cross section includes a number of portions that interact to releasably grip a cylindrical object (18). Two jaws (14, 16) extend from a base (12) and are shaped to embrace the cylindrical object. The base (12) and one of the jaws (14) are rigid. A second jaw (16) melds into the base and has a gripping surface that closely follows the contour of the cylindrical object. The distal end (22) of the second jaw diverges from the cylindrical object and reverts back to the base, terminating in a free end (24). This free end serves as an actuator for releasing the cylindrical object. When the free end is pressed by the user in the direction of the first jaw (14), the reverted portion (26) pivots about a fulcrum (30) formed by an extension of the base to draw open the second jaw, thereby releasing the cylindrical object. In contrast, when a force (32) is applied to the cylindrical object to dislodge it, the second jaw (16), being less stiff than the other jaw (14) is forced to rotate slightly, which brings a portion (28) of the reverted portion into pressing contact with a portion (30) of the base, thereby greatly increasing the resistance of the second jaw to further opening movement.

3 Claims, 2 Drawing Sheets

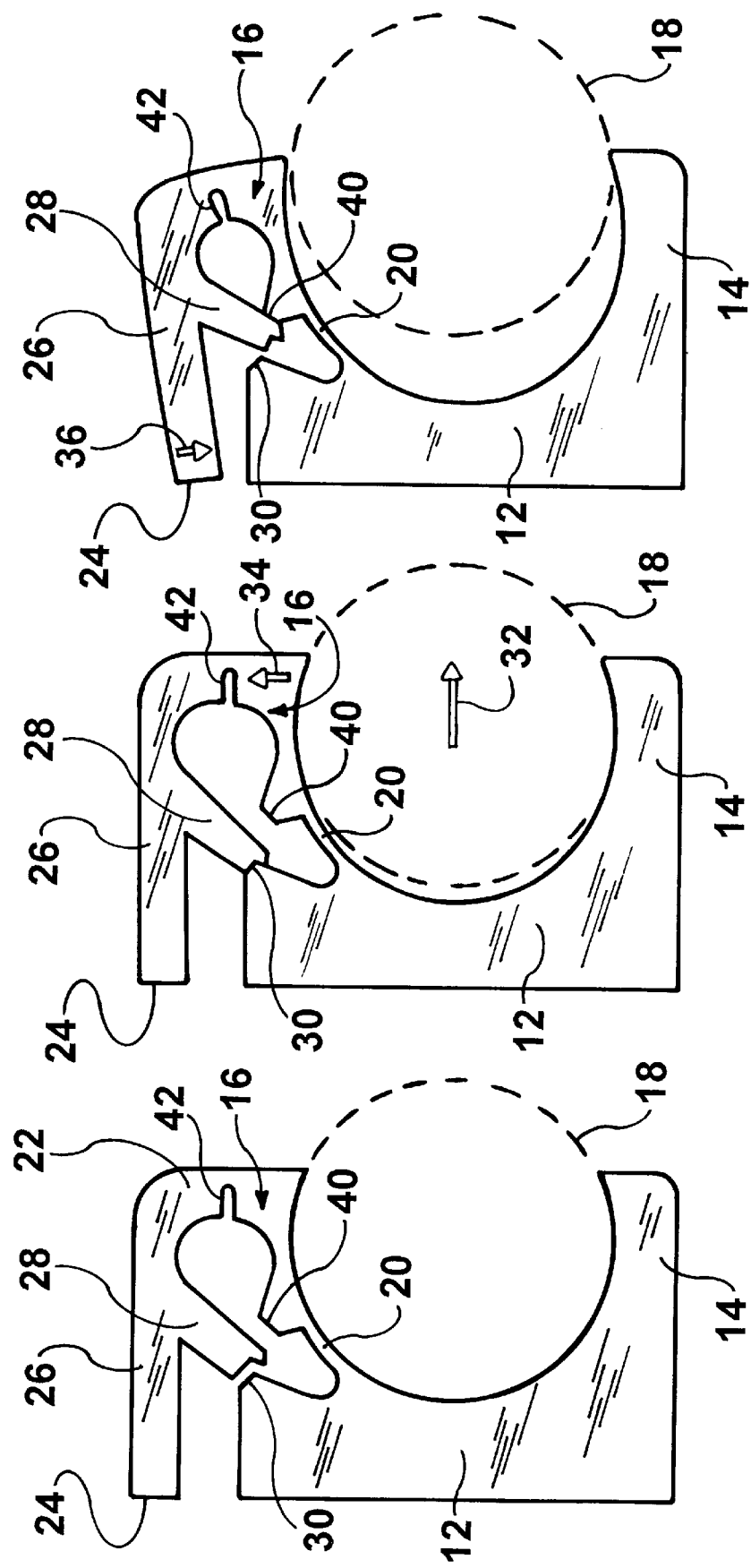

EXTRUDABLE LOCKING CLAMP WITH RELEASE

CROSS REFERENCE TO RELATED APPLICATIONS

This application is the completion of provisional application Ser. No. 60/045,378 filed May 1, 1997. I hereby claim the benefit under 35 U.S.C. §119(e) of that provisional application.

BACKGROUND OF THE INVENTION

1. Field of the Invention

The present invention is in the field of supports and more specifically relates to a support having a locking clamping mechanism for application to a generally cylindrical object and having a manually-operated release. Typical uses of the device include removably attaching a pipe to a wall, removably attaching a bundle of electrical wires to a structural member on an aircraft or ship, and holding brooms, flashlights, garden tools, and the like to a wall.

2. The Prior Art

In U.S. Pat. No. 2,948,940 issued Aug. 16, 1960 to Degener, there is shown a self-locking clamp that includes a base from which two jaws extend to clamp cylindrical objects. As described at column 2, lines 47–72, any attempt to pull the clamped object from between the jaws causes the jaws to grip it tighter. The gripped object can only be released by applying a force T to one of the jaws, as shown in FIG. 5. Degener does not suggest the use of a lever for applying such a force.

In U.S. Pat. No. 5,535,970 issued Jul. 16, 1996 to Gobbi, there is shown a one-piece clamp that can be opened by squeezing opposite sides together. The clamp is used for supporting external wall-mounted piping, and it bears little resemblance to the present invention.

In U.S. Pat. No. Des. 342,005 issued Dec. 7, 1993 to Forsberg, there is shown a toggling clamp for holding generally-cylindrical objects. It works on a different principle from the present invention, and it lacks a release mechanism.

In U.S. Pat. No. 5,699,943 issued Dec. 23, 1997 to Schaefer et al., there is described a device for holding a cylindrical object. It differs from the present invention in that it is not a one-piece article and in that one of the jaws is designed to yield when a strong force is applied to the cylindrical object.

SUMMARY OF THE INVENTION

It is an object of the present invention to provide a simple but reliable means for attaching generally cylindrical objects, such as pipes, bundles of wires, and handles, to a wall or similar structural member in such a way that the attached object can readily be removed manually from the clamp and later replaced in the same clamp.

A further objective of the present invention is to provide a clamp that can be formed by an extrusion process or by a molding process, which consists of a single piece, thereby eliminating assembly, and which can be manufactured economically.

In accordance with the present invention, two jaws extend from a base and are shaped to embrace a cylindrical object. One of the jaws is, for all practical purposes, rigid and melds into the base forming a cradle for the cylindrical object. The other jaw also melds into the base and has a gripping surface that closely follows the contour of the cylindrical object. The distal end of the second jaw diverges from the cylindrical object and reverts back toward the base, terminating in a free end. This free end serves as an actuator for releasing the cylindrical object. When the free end of the reverted portion of the second jaw is pressed by the user in the direction of the first jaw, the reverted portion pivots about a fulcrum formed by an extension of the base to draw open the distal end of the second jaw.

In order for this releasing action to be possible, the second jaw must be capable of deforming elastically to move outwardly from the cylindrical object being held. Unfortunately, if the second jaw is sufficiently elastic to promote easy release of the cylindrical object, it may also be incapable of grasping the cylindrical object tightly enough.

The present inventor has solved this dilemma in an ingenious way, as follows.

When a strong force is applied to the cylindrical object to draw it from between the jaws, the first jaw, because of its thickness, remains practically rigid, and the thinner second jaw is forced open by the cylindrical object. Since the second jaw is rooted to the base, as it is forced open, it rotates slightly about the region where it is joined to the base. In accordance with the present invention, this slight rotation brings a portion of the reverted portion of the second arm into contact with a portion of the base, thereby greatly increasing the resistance to the slight rotational movement. This is equivalent to making the second jaw stiffer in opposing the force applied near the distal end of the second jaw by the cylindrical object as it is being withdrawn.

In this way, the present inventor was able to reconcile two conflicting requirements, namely, that the second jaw be stiff to strongly oppose withdrawal of the cylindrical object and yet be flexible enough so that a small force applied to the actuator is sufficient to open the second jaw when the user desires to release the cylindrical object.

The novel features which are believed to be characteristic of the invention, both as to structure and operation, together with further objects and advantages thereof, will be better understood from the following description considered in connection with the accompanying drawings in which two preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWING

FIG. 4 is a side elevational view of a second preferred embodiment of the clamp of the present invention in its normal holding position;

FIG. 5 is a side elevational view of the clamp of FIG. 4 showing how forced withdrawal of the cylindrical object is opposed; and, FIG. 6 is a side elevational view of the clamp of FIG. 4 showing how release of the cylindrical object is effected.

DETAILED DESCRIPTION OF THE PREFERRED EMBODIMENT

Figures 1, 2, 3:
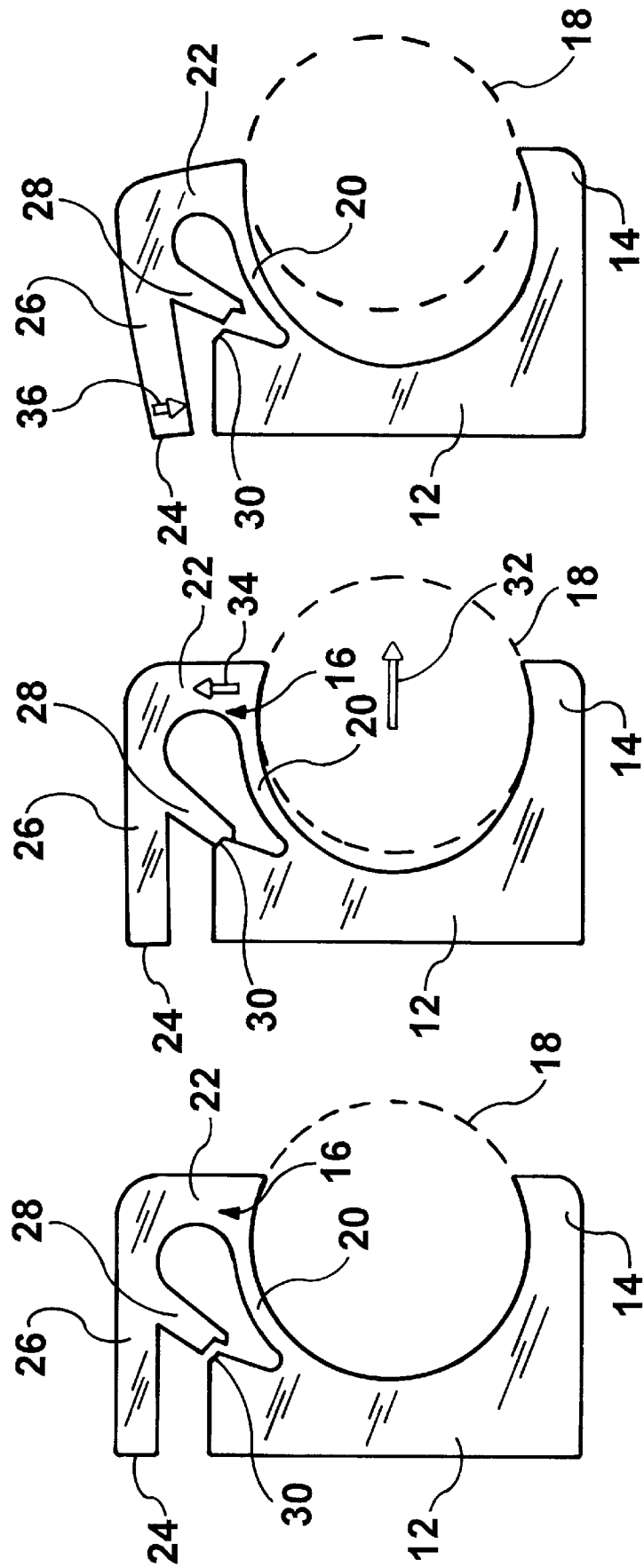
FIG. 1 is a side elevational view of the clamp of the present invention in its normal holding position in a first preferred embodiment.
FIG. 2 is a side elevational view of the clamp of FIG. 1 showing how forced withdrawal of the cylindrical object is resisted.
FIG. 3 is a side elevational view of the clamp of FIG. 1 showing how release of the cylindrical object is effected.

FIG. 1 is a side elevational view of a first preferred embodiment of the clamp of the present invention. The clamp includes a base 12 from which a first jaw 14 and a second jaw 16 extend to embrace a cylindrical object 18. The base 12 and the jaw 14 are sufficiently thick that they may be considered to be rigid so far as the operation of the device is concerned. However, a portion 20 of the second jaw 16 is intentionally made thinner where it joins the base 12 so that the second jaw can flex slightly to open and close, thereby locking onto the cylindrical object 18 and releasing it.

A distal portion 22 of the second jaw extends away from the cylindrical object 18 and then reverts toward the base. The free end 24 of the reversion 26 serves as an actuator used for releasing the cylindrical object, as will be seen in the description of FIG. 3 below. The reverted portion 26 includes a spur 28 that lies adjacent a projection 30 of the base. Although in FIG. 1, the spur 28 is shown spaced slightly from the projection 30, in an alternative embodiment, the spur 28 may actually be in contact with the projection 30 when the cylindrical object 18 is present. The first and second jaws extend more than halfway around the cylindrical object 18, so that it cannot be withdrawn from between the jaws without causing some elastic deformation of the clamp, specifically, at the thinner portion 20 of the second jaw.

FIG. 2 shows the clamp of FIG. 1 as the cylindrical object is pulled by a force in the direction of the arrow 32. As noted above, the base 12 and the first jaw 14 may be considered to be rigid, and as the cylindrical object 18 is pulled to the position shown in FIG. 2 from the position shown in FIG. 1, the second jaw 16 is forced to open slightly. In FIG. 2, the point of contact of the second jaw with the cylindrical object lies toward the distal portion 22 of the second jaw, and away from the more flexible portion 20. Accordingly, the second jaw tends to undergo a slight counterclockwise rotation that causes the spur 28 to bear against the projection 30. This puts a compressive load on the spur 28 and the projection 30, which is effective to prevent further opening of the second jaw. Note that if the reverted portion 26 and the spur 28 were absent, the flexibility of the thin portion 20 would permit easy withdrawal of the cylindrical object. Because of the presence of the spur 28 and the projection 30, as the force denoted by the arrow 32 increases, the compressive load on the spur 28 and the projection 30 also increases. The spur 28 and the projection 30 can withstand considerable compressive forces, and accordingly, the amount of force required to withdraw the cylindrical object is extremely great.

If the second jaw had been made of a single thick piece comparable to the first jaw, it would be so stiff that it could not easily be opened to permit the cylindrical object to be withdrawn. The present inventor has resolved these conflicting requirements by providing a second jaw that has a thin portion 20 to permit the jaw to flex when it is intentionally opened and has also provided the second jaw with the spur 28 and the projection 30 that impart to the second jaw an enormous stiffness when the cylindrical object is drawn away from the base.

FIG. 3 shows how the cylindrical object may be released.

A significant difference between FIG. 2 and FIG. 3 is that in FIG. 2 the force applied to the second jaw by the cylindrical object is applied at the distal portion 22 of the second jaw and is directed in the direction shown by the arrow 34. In contrast, in FIG. 3, the releasing force applied by the user is applied near the free end 24 of the reverted portion and is directed as indicated by the arrow 36.

The force 36 applied by the user deforms the thin part 20 sufficiently to cause the spur 28 to bypass the projection 30. Only the thin part 20 of the second jaw remains to oppose opening of the second jaw, and because the force 36 is applied closer to the base than the portion where the flexing of the thin portion 20 occurs, the force 36 produces a slight counterclockwise rotation of the second jaw, which causes the thin portion 20 to flex, permitting the second jaw to open readily.

The second preferred embodiment, shown in FIGS. 4–6, works on the same basic concept as the first preferred embodiment of FIGS. 1–3, but includes a small modification that renders it easier to use.

As best seen in FIG. 4, the second preferred embodiment includes a protrusion 40 located on the second jaw 16 distally of the thin portion 20. The embodiment of FIGS. 4–6 also includes a notch 42 in the distal portion 22 of the second jaw.

As seen in FIG. 5, a force 32 attempting to pull the cylindrical object 18 out from between the jaws exerts a force denoted by the arrow 34 on the second jaw, rotating the latter counterclockwise and causing the spur 28 to make contact with the projection 30. As noted in connection with FIG. 2, when such contact is made, the stiffness of the second jaw is increased considerably, thereby strongly resisting removal of the cylindrical object.

The purpose and function of the protrusion 40 and the notch 42 become apparent from FIG. 6. During the first stages of the release movement, the notch 42 permits the distal portion 22 of the second jaw to yield more readily to the applied force represented by the arrow 36 until the spur 28 makes contact with the protrusion 40. Once this contact is made, those portions of the second jaw distal from the thin portion 20 rotate counterclockwise about the thin portion thereby opening the second jaw and permitting removal of the cylindrical object.

Although the drawings show side elevational views of the invention, it is noteworthy that the device has a uniform cross section that permits it to be manufactured by an extrusion process. The extrusion would be an extended object of uniform cross sectional shape which subsequently could be sliced to provide the individual clamps. Alternatively, the article could be manufactured by a molding process.

Thus, there has been described a one-piece clamp having a release, and suitable for holding a cylindrical object. The clamp can be attached to a wall or other structure by bonding or by the use of appropriate fasteners so that cylindrical objects can be releasably mounted on a wall or other structural member.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A clamp having a locking action for application to a cylindrical object and having a manually-operated release, comprising:

a one-piece article having a constant cross section in one direction and including the following portions:

a base (12) that is substantially rigid;

a first jaw (14), also substantially rigid, extending distally from said base and melding into said base to form a cradle for the cylindrical object;

a second jaw (16) that melds into said base and that has a surface that conforms to the contour of the cylindrical object, having a distal portion (22) and an elastically deformable portion (20) located between said base and said distal portion, said distal portion diverging from the cylindrical object then melding into a reversion portion (26) that extends toward said base and that terminates in a free end (24), said distal portion being elastically deformable and said reversion portion being substantially rigid;

said reversion portion including a spur portion (28) extending obliquely toward said base from said reversion portion and terminating in an end surface that is approximately perpendicular to the direction in which said spur moves when an applied force (32) pulls the cylindrical object away from said base thereby causing elastic deformation of said elastically deformable portion (20) of said second jaw;

said base including a projection (30) extending in a direction opposite that of said spur and terminating in an end surface that is parallel to and proximate the end surface of said spur, so that when an applied force (32) pulls the cylindrical object away from said base the elastically deformable portion of said second jaw bends elastically causing the end surface of said spur to press against the end surface of said projection thereby preventing opening of said second jaw, and so that when a releasing force (36) is applied to the free end of said reversion portion, the elastically deformable portion (20) bends elastically causing the end surface of said spur to slide laterally on the end surface of said projection and to become unseated from it, after which continued application of the releasing force causes bending of the elastically deformable portion of said second jaw, thereby opening said second jaw to release the cylindrical object.

2. The clamp of claim 1 further comprising:

a protrusion (40) located on said second jaw (16) distally of said elastically deformable portion (20) and extending from the side of said second jaw nearer said reversion portion (26) in a direction generally perpendicular to said spur portion (28) so that when a releasing force (36) is applied to the free end of said reversion portion, the spur portion, after becoming unseated from the projection (30), makes contact with said protrusion (40) which serves as a fulcrum about which said reversion portion (26) rotates to draw open said second jaw.

3. The clamp of claim 2 further comprising:

a notch (42) extending into said distal portion (22) to relieve compression when the releasing force (36) is applied, so as to render said distal portion more flexible.

* * * * *